United States Patent [19]
Beall et al.

[11] Patent Number: 5,176,865
[45] Date of Patent: Jan. 5, 1993

[54] PULTRUSION METHOD FOR CONDENSATION RESIN INJECTION

[75] Inventors: Frank C. Beall, Moraga, Calif.; Johan D. Koppernaes, Charlestown, Mass.

[73] Assignee: Weyerhaeuser Company, Tacoma, Wash.

[21] Appl. No.: 622,212

[22] Filed: Nov. 30, 1990

Related U.S. Application Data

[63] Continuation of Ser. No. 257,514, Oct. 13, 1988, abandoned.

[51] Int. Cl.⁵ .......................... B05D 1/00; B29C 47/02
[52] U.S. Cl. .................................. 264/174; 156/180; 427/434.6
[58] Field of Search ............ 264/136, 137, 174; 156/180; 427/434.6, 434.7

[56] References Cited

U.S. PATENT DOCUMENTS

| | | | |
|---|---|---|---|
| 3,244,784 | 4/1966 | Boggs | 264/137 |
| 3,529,050 | 9/1970 | Smith | 264/137 |
| 3,533,870 | 10/1970 | Mackay et al. | 156/180 |
| 3,960,629 | 6/1976 | Goldsworthy | 156/180 |
| 4,028,477 | 6/1977 | Goppel et al. | 428/285 |
| 4,207,129 | 6/1980 | Tadewald | 156/242 |
| 4,252,696 | 2/1981 | McQuarrie | 264/137 X |
| 4,305,770 | 12/1981 | Stiles | 156/180 |
| 4,312,917 | 1/1982 | Hawley | 264/174 X |
| 4,419,400 | 12/1983 | Hindersinn | 156/180 X |
| 4,495,017 | 1/1985 | Abe et al. | 156/181 |
| 4,555,544 | 11/1985 | Meyer et al. | 524/595 |
| 4,588,538 | 5/1986 | Chung et al. | 264/136 X |
| 4,752,513 | 6/1988 | Rau et al. | 428/91 |
| 4,873,128 | 10/1989 | Ma et al. | 427/434.7 |
| 4,880,893 | 11/1989 | Waitkus | 528/129 |
| 4,983,453 | 1/1991 | Beall | 428/294 |

FOREIGN PATENT DOCUMENTS

| | | |
|---|---|---|
| 8702536 | 9/1987 | Brazil . |
| 1129580 | 8/1982 | Canada . |
| 158118 | 10/1985 | European Pat. Off. . |
| 1539577 | 9/1968 | France . |
| 2592609 | 7/1987 | France . |
| 2101033 | 1/1983 | United Kingdom | 264/137 |

OTHER PUBLICATIONS

"Pultrusion and Pulforming", Glenn W. Ewald, Modern Plastics Encyclopedia, 1988, pp. 278-280.

"Nordic Pull-Press" Brochure, Nordic Supply AS N-6260, Skodje, Norway (Undated).

(List continued on next page.)

*Primary Examiner*—Leo B. Tentoni
*Attorney, Agent, or Firm*—Klarquist, Sparkman, Campbell, Leigh & Whinston

[57] ABSTRACT

A composition, apparatus and method for making resin bonded composite pultruded products using a thermosetting resin is disclosed. The resin includes a condensation resin which has a high solids content. A pultrusion system includes reinforcing material supply, a pultrusion die adapted to be heated, injection device for injecting resin into the die, and pulling device for drawing product through the die. The method includes supplying strands of the reinforcing material to the die and grasping the strands with the pulling device, injecting a condensation-type monomer resin into the die to impregnate the reinforcing material within the die, and pulling the resin-impregnated strands through the die at a rate that permits the resin to condense to an essentially cured state by the time the composite product is withdrawn from the die. The die is a modular die such that various sections of the die may be selected as desired to change process parameters. The die is divided lengthwise into a plurality of regions or sections, typically comprising an entry section, a resin injection section, a transition section and a profile section, which are joined together to create the desired die characteristics. Also disclosed is an adaptation die to convert a conventional non-injection die into an injection die. The adaption die comprises an entry section, a resin injection section and a transition section adapted for connection to the conventional die.

10 Claims, 3 Drawing Sheets

OTHER PUBLICATIONS

"The Development of In-Situ Pultrusion for Polymeric Composites", 33rd Int'l SAMPE Symposium, H. H. Hsu (Mar. 1988).

"Pultrusion Process Variables and Their Effect Upon Manufacturing Capability", Sumerak et al., 39th Annual Conference, Reinforced Plastics/Composites Institute, Jan. 16–19, 1984.

"The Correlations of Processing Variables for Optimizing the Pultrusion Process", Ma et al., Sampe Journal, Oct. 1986.

"Development of a Variable Cross-Section Pultrusion (VSP) Die", 38th Annual Conference, Reinforced Plastics/Composites Institute, Feb. 7–11, 1983, Richard, et al.

PULTRUSION METHOD FOR CONDENSATION RESIN INJECTION

This application is a continuation of application Ser. No. 07/257,514, filed on Oct. 13, 1988, now abandoned.

BACKGROUND OF THE INVENTION

The present invention relates to a composition and method for making pultruded products using a thermosetting resin which is injected into a forming die. In particular, the resin is a condensation-type monomer which is injected into a modular die with variable heating zones and cross-sectional configurations.

Pultrusion is a process for continuously forming reinforced plastic materials having a uniform cross-sectional profile. The term "pultrusion" is a hybrid which combines the words "pull" and "extrusion" to designate that the product is literally pulled through a forming die. In its most usual form, pultrusion involves feeding a plurality of reinforcing filaments, such as fiberglass roving strands, with or without additional plies of glass mat of appropriate width, through resin bath and a pultrusion die. The pultrusion die is typically heated to polymerize the resin and the cross-sectional shape of the die's exit orifice generally determines the shape of the finished product. The typical resin in the resin bath is a thermosetting addition-type monomer. Alternatively, the reinforcing filaments are drawn directly into the die where resin is injected directly. As the product is pulled through the die and out of the exit orifice in the end of the die, the resin is either cured, or very nearly cured. The endless product so formed is then cut to appropriate length. Many variations of this general process have been developed as the technology has matured. A general background on pultrusion is found in an article by Ewald, *Modern Plastics Encyclopedia*, pp. 378–84, McGraw-Hill, Inc., New York (1988).

Pultruded products have unique physical properties, such as being electrically insulative, thermally insulative and corrosion resistant, along with having high specific strength and relatively unlimited length. Pultruded products are therefore used in a great variety of applications. In many instances they have replaced metallic construction materials, particularly those used in highly corrosive environments. Structural beams, floor gratings, handrails, ladders and many similar products are now made using a pultrusion process.

Reported commercial pultrusion resins are comprised substantially of addition-type monomers, which produce no water or other by-products during polymerization. An experimental resin of the condensation type (an acid-catalyzed phenolic) has a sufficiently low viscosity for use in a resin-bath pultrusion system. Although this resin has a rapid cure rate, it has several undesirable side effects, such as severe corrosion of the steel dies and residual acidity of the final product. In addition, acid-catalyzed phenolics must be mixed immediately before use because of their relatively short pot life. The inherent instability of the acid-catalyzed resin may also cause variability in the product.

An alternative approach is to use neutral or basic phenolics that would not have these disadvantages. However, neutral or basic phenolics have high viscosities and require relatively high curing temperatures (approximately 150° to 200° C.). This high viscosity makes the resins very difficult to use in openbath pultrusion systems, where low viscosity is required to obtain proper wetting of the fiberglass reinforcing strands. In addition, there are processing and product advantages in using resins with the highest possible solids content. However, the viscosity of the phenolic resins increases directly with increased solids content, thus making high solids content resins hard to utilize in open bath systems.

Two general types of dies can be used in pultrusion—a conventional profile die ("profile") and a resin injection die ("injection"). The profile die is used in combination with open resin bath systems, whereas the injection die has resin injected directly into the die. In general, both of these die types are custom made of steel, which is often chrome plated, and are very costly to manufacture. Different die configurations are required depending on the type of resin used, curing rate, final product structural configuration, cross-sectional profile, etc.

A paper entitled "The Development of In-Situ Pultrusion for Polymeric Composites" presented by H.H. Hsu et al. at the 33rd International SAMPE Symposium, Mar. 7–10, 1988 discusses the use of a laboratory resin injection system for addition polymerization (i.e., epoxy). The resin injection die described is similar to that manufactured by Nordic Supply AS, Aalesund, Norway, which has been available commercially for approximately 20 years. The process described is similar to that for mixing and injecting acid-catalyzed phenolics, which has been practiced at Nordic Supply since around March, 1987. Mixing/injection equipment for such resin injection has been manufactured by several companies.

In Hsu et al., an epoxy resin with filler is mixed with a hardener and an accelerator in the die head. A preheating stage is used to reduce the viscosity of the resin sufficiently for mixing and injection while keeping the temperature below that of initial reaction. The temperature increase is also needed to reduce the viscosity sufficiently for penetration of the fiberglass.

The process of Hsu et al. is also disclosed in Brazilian Pat. No. 8702536 to Tong, which shows a continuous process wherein epoxy resin and hardener are continuously mixed and then passed without contact with air into a die where it contacts reinforcing fibers fed through the die. The fibers are impregnated with the resin-hardener mixture and shaped by the die. However, the patent does not discuss the use of an injection system for use with condensation-type resins.

It is an object of the present invention to overcome the problems associated with acid-cured phenolics.

It is an object of the present invention to provide a system for pultruding condensation-type resins.

It is also an object of the present invention to provide a neutral or basic phenolic resin which can be easily accommodated in injection dies.

It is a further object to provide an injection system which can be utilized with neutral or basic phenolic resins.

It is also an object of the present invention to provide a die for processing a condensation-type resin.

It is also an object of the present invention to adapt conventional pultrusion dies to permit resin injection pultrusion with any addition or condensation resin.

It is a further object to provide a modular die in which the operating parameters of the die, such as cross-sectional profile, length, temperature and injection site, can be easily changed for varying the process parameters and producing differing products, thus reducing machine downtime, die cost and experimentation risk.

A further object of the present invention is to permit on-line experimentation and optimization of die length, taper, volume and other die parameters in die development to match to processing and product needs (speed, shrinkage, density, product diameter, etc.).

It is a further object of the present invention to allow different construction materials to be used for the various sections. This can result in cost savings, in addition to time savings during fabrication of the sections, and flexibility in means of heating.

These and many other objects of the present invention will become readily apparent to those skilled in the art upon reading the following detailed description.

SUMMARY OF THE INVENTION

The present invention comprises a method for making a resin bonded composite pultruded product and the resin which is used. The method uses a pultrusion system comprising a supply of reinforcing materials, a heated pultrusion die, injection means for injecting the resin into the die and a pulling mechanism for drawing product out of the die. The method comprises supplying strands of the reinforcing material to the die and grasping the strands with the pulling mechanism. A monomeric resin is injected into the die to impregnate the reinforcing materials within the die. The resin-impregnated strands are drawn through the heated die with the pulling means at a rate that permits the resin to condense to an essentially cured state by the time the composite product is withdrawn from the die. If desired, the resin is heated before injection into the die to reduce its viscosity to facilitate injection and impregnation into the reinforcing material.

The resin of the present invention is a condensation-type resin. The phenolic resin disclosed is a typical condensation monomer that has been formulated to eliminate the acid-catalyzed phenolic problems. The resin is constituted to have a high solids content and is essentially neutral. Curing is effected by a direct condensation reaction at elevated temperature without using an acid catalyst.

The die of the present invention is a modular die such that various sections of the die may be selected as desired to change process parameters for the formation of the finished product. The die is divided lengthwise into a plurality of discrete sections, typically comprising an entry section, a resin injection section, a transition section and a profile section. Each of the sections may have different heating capabilities and different configurations, such as cross-sectional profile, length, sloped areas, etc. and are joined together to create the desired die characteristics.

DETAILED DESCRIPTION OF THE PREFERRED EMBODIMENTS

General Pultrusion System

Figure 1:
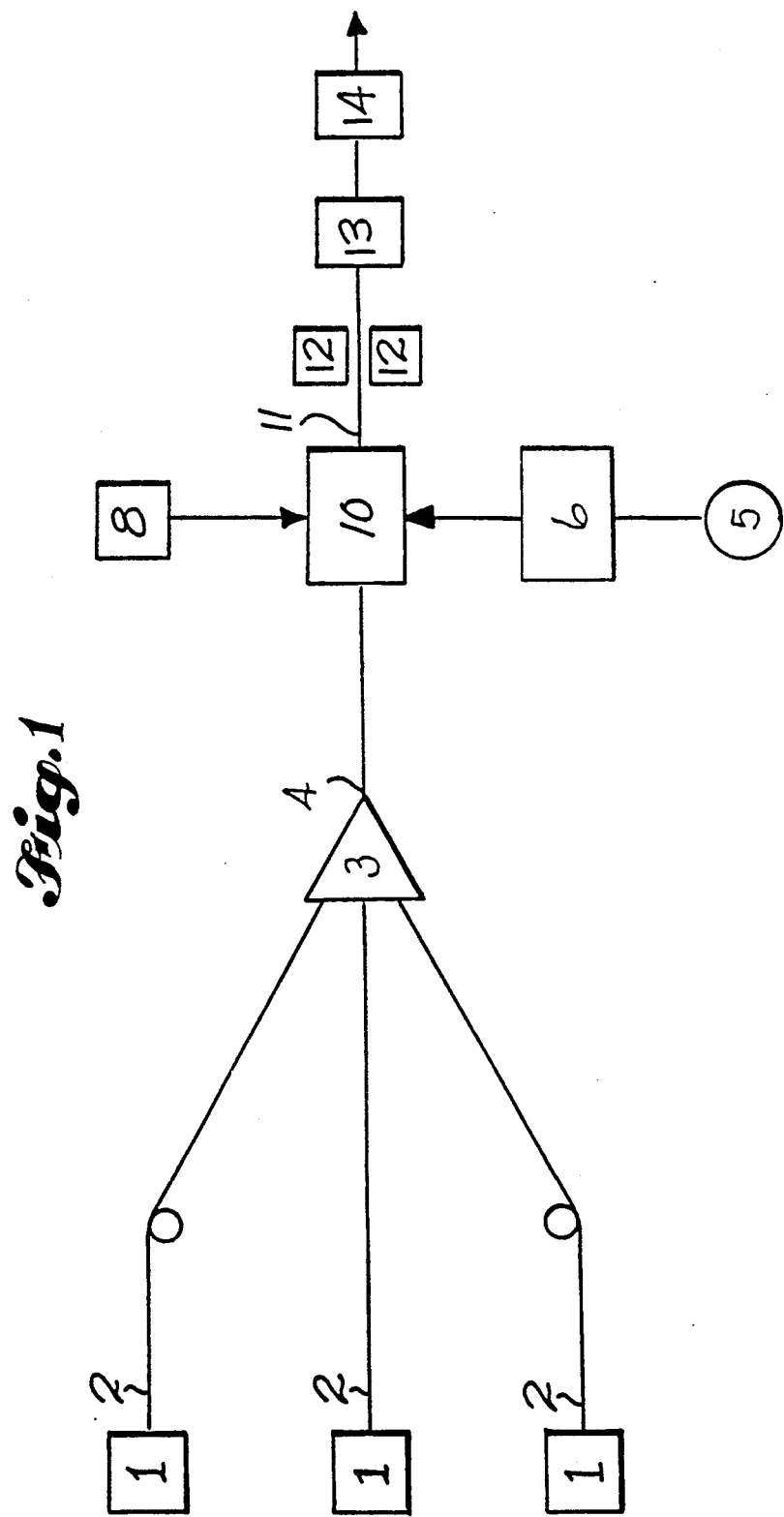
FIG. 1 is a schematic diagram showing a pultrusion system for use with the present invention.

The present invention is utilized with a general pultrusion system, such as shown in FIG. 1. The pultrusion system includes a source of reinforcing materials 1, such as fiberglass reinforcing strands 2. The strands 2 are fed through a former 3 in which the individual strands 2 are gathered to form a bundle 4 which is fed into a pultrusion die 10. A thermosetting resin from a resin source 5 is injected into the die by injection means 6, such as a pump or other suitable injection system. The bundle 4 of reinforcing strands are impregnated with the resin in the die 10, which may be provided with an external source of heat 8 if desired. The resin is either cured o partially cured within the die 10 to form a finished composite product 11 of resin and reinforcing materials.

A pulling system, such as a pair of pullers 12, is provided to pull the finished product 11 out of the die 10. The resin-impregnated bundle 4 is drawn through the heated die 10 by the pulling means 12 at a rate that permits the resin to condense and harden to an essentially cured state by the time the composite product 11 is withdrawn from the die 10. Dies of various sizes, internal cross-sectional areas, length, etc. may be used depending upon the type of resin used, the finished product requirements, and other parameters.

A post-cure heater 13 may be provided, if desired, to heat the finished product 11 and complete the resin cure. A cutter 14 cuts the finished product into pieces of the desired length.

Resin

The resin used in accordance with the present invention is a condensation-type monomer resin. The resin is a neutral or basic resin to overcome many of the problems associated with acid-catalyzed resins.

A condensation resin undergoes condensation or step-reaction polymerization in which two polyfunctional molecules react to produce one larger polyfunctional molecule, often with the elimination (condensation) of small molecules such as water. In contrast, an addition resin undergoes addition or chain-reaction polymerization which involves chain reactions, typified by vinyl monomers in which a free radical reacts to open the double bond of a monomer and add to it, with an electron remaining unpaired. Addition reactions typically produce a long chain in a relatively short time.

The condensation resin used in accordance with the present invention, can be activated by heat, either alone or in combination with an alkaline catalyst. In general, the presence or lack of a catalyst has an effect on the temperature required to cure the final product. The alkaline catalyst can be any one of a number of basic materials such as calcium carbonate or caustic soda.

In general, it is desirous to use a resin with a high solids content of at least about 70%, preferably at least about 80%, so that fewer byproducts are produced by condensation polymerization.

Resin Injection Die

Figure 3:
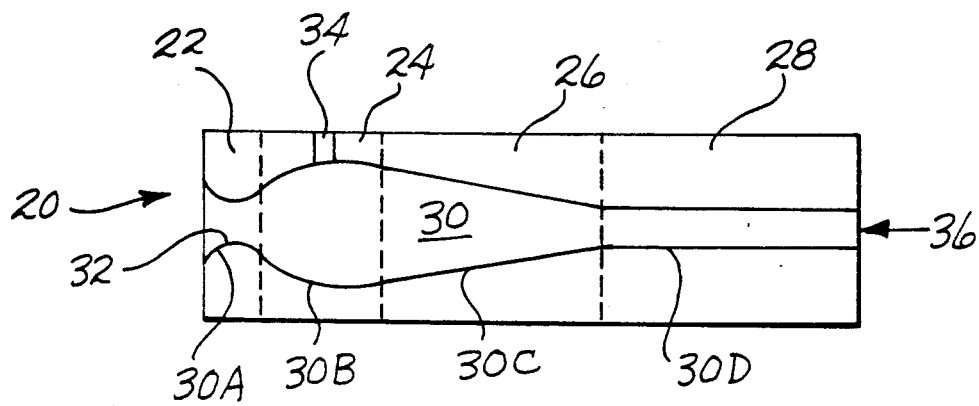
FIG. 3 is a cross-sectional view of a modular injection die in accordance with the present invention.

A modular die 20 in accordance with the present invention are shown in FIG. 3. The die generally has four discrete regions or sections: entry section 22, resin injection section 24, transition section 26 and profile section 28. The sections are aligned such that a continuous axial bore 30 extends through the die 20.

In operation, reinforcing strands (not shown) are threaded through the bore 30 and a suitable pulling means (not shown) is provided for pulling the strands and finished product through and out of the die 20. The sections are connected together by a suitable means (not shown) adapted to permit rapid replacement of any section with a minimum of machine downtime. Such suitable means may include external bolts, clamps, frames, etc.

The length, bore size and shape, and other dimensions of each of the regions or sections may be varied depending upon the process parameters required, the finished product's characteristics, the type of resin being used, etc. The dimensions and shape of the die may be somewhat different depending upon whether the resin is an addition resin (such as polyester, vinyl ester, epoxy, or methyl methacrylate) or a condensation resin (such as phenol formaldehyde, polyurethane, or polyamide). Much of this difference can be attributed to the polymerization process itself and generation of byproducts from the condensation resins. For example, at any given time during polymerization, addition resins have two distinct chemical species, monomer and polymer, as a consequence of the rapid growth of a polymer chain after initiation of polymerization. Polymerization of condensation resins, also known as "step-wise polymerization," shows a gradual growth in degree of polymerization. Because of this, the monomer disappears early in the process through the formation of dimers, trimers, etc. and most of the water produced by condensation is released at that time. The characteristics of the die which are affected by the reaction differences between addition and condensation resins will be explained as the various sections are discussed.

Entry section 22 has an internal bore 30A with an inlet opening 32. The inlet opening 32 is typically sized slightly smaller than the rest of the bore 30A to compress the reinforcing strands tightly together, thereby sealing the opening 32 and preventing leakage of resin from the die 20. If desired, the entry section 30A is also cooled to minimize backflow of the resin out of the die 20. The entry section 32 helps to maintain the orientation of the reinforcing strands as they enter the die 20. The size of the inlet opening 32 may be modified to allow changes in the amount, size, and type of reinforcing strands being fed through the die 20 or the degree of compression of the strands. The size of the inlet opening 32 also depends upon the resin pressure in the die 20.

The resin is injected into the bore 30B of the resin injection section 24 through a suitable injection port 34. Most addition resins are premixed with suitable catalysts before being pumped into the resin injection section 24. The resin is typically injected under pressure to assure proper penetration of the reinforcing strands. During injection, the applied pressure during pumping of the resin is maintained at a level sufficient to assure full penetration of the fiberglass strands and depends somewhat on the machine speed and resin curing rate. Typical injection pressures are in the range of about 30 to 100 psi.

Figure 2:
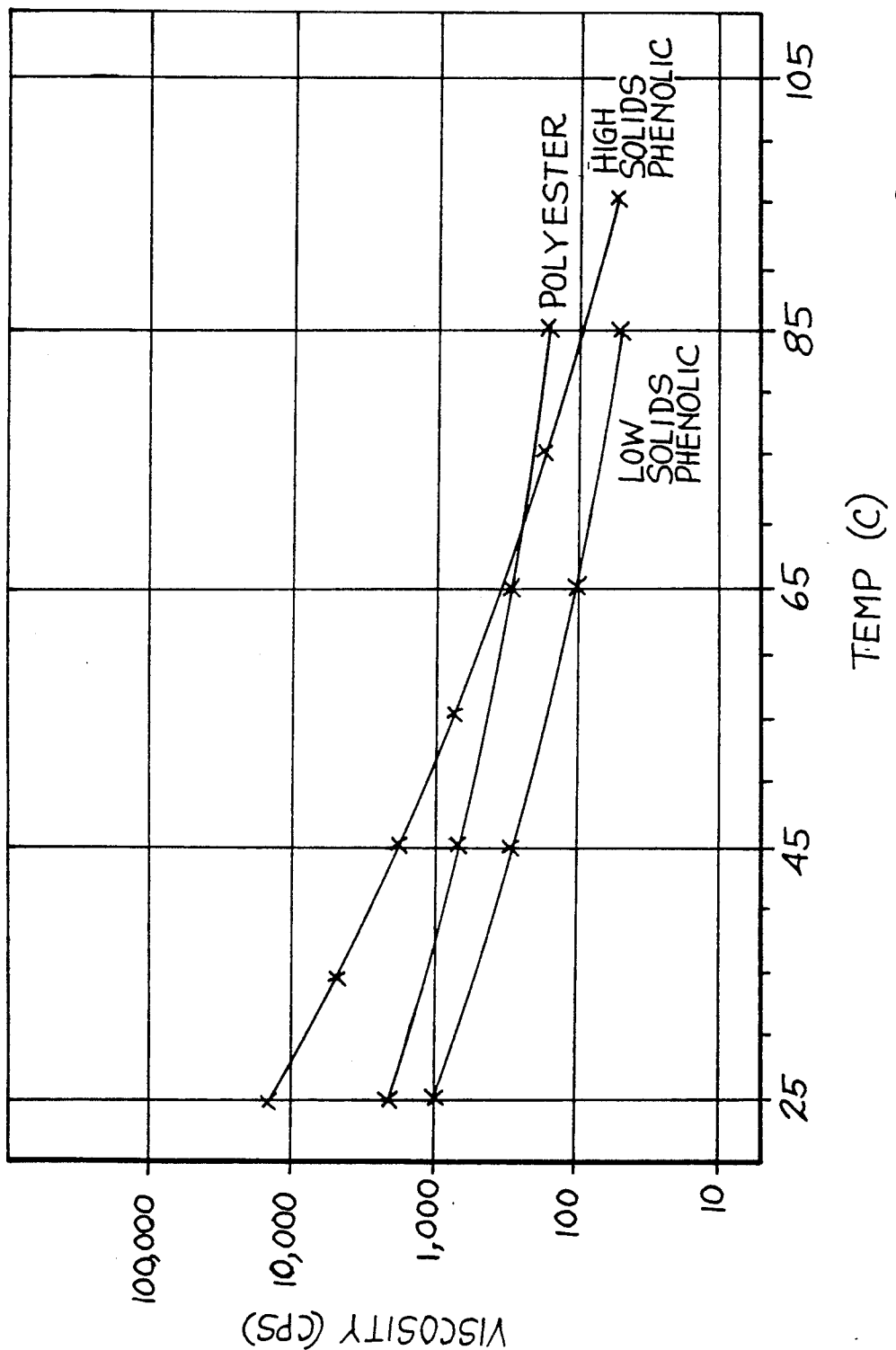
FIG. 2 is a graph showing the relationship of viscosity to temperature for several types of resins.

If desired, the resin may also be heated, to a temperature below the point of polymerization, to decrease its viscosity and assist in injection and wetting. The relationship between resin viscosity and temperature is shown in FIG. 2 for various thermosetting resins, including a low solids phenolic resin, a high solids phenolic resin and a polyester resin. The resin viscosity at the time of wetting should be less than about 200 cp for adequate penetration and wetting of the reinforcing strands.

If desired, an external resin preheating process step may be added. Generally, the resin may be heated to a temperature above ambient for injection, up to a temperature of around 60° C. However, external preheating is often a highly unreliable process because of resin precuring within the heated lines and necessity to frequently purge and clean the system. Resin pressurization has a critical role in resin penetration (also affected by resin viscosity), volatilization of gases from the resin, and backflow of resin through the entry section 12.

To lower the resin viscosity, the resin injection section 24 is typically heated to heat the resin being injected to achieve proper reinforcing strand penetration. The die is typically heated to a temperature of at least about 180° C. A greater degree of heating may be required to reduce the viscosity caused by the high solids content which are typical of neutral or basic condensation resins. Other sections of the die, such as the transition section 26 and the profile section 28 may also be heated to assist resin gelling and curing.

Heating of the die may be accomplished in a number of ways depending upon the type of material from which the die is constructed. In some sections, particularly the profile section 28, it may be desirable to fabricate the section from a material which would permit transmission of electromagnetic waves through the die for curing the resin. Such materials include ceramics, glass, and plastics. In a typical configuration, the resin injection section 24 is made of metal, permitting the outer surface of the section to be heated by direct contact with conventional heating elements and the heat conducted through the metal to the resin.

The size and shape of the resin injection section 24 depends on the amount and type of reinforcing fibers and resin being used. The cross-sectional diameter of bore 30B of the resin injection section 24 generally increases in the direction of product travel to permit some "springback" or separation of the reinforcing strands for improved penetration and wetting by the resin.

The transition section 26 has a hollow bore 30C which connects the bore 30B of the injection section 24 to bore 30D of the profile section 28. The cross-sectional area of the bore 30C is generally tapered down in the direction of product travel, causing excess resin to be squeezed out of the reinforcing strands. Polymerization may be initiated in this section, but for most addition resins, the resin solution remains primarily monomer.

The transition section 26 of the die 20 has a distinctly different function when condensation polymers are being used. Whereas the transition section 26 for addition resins is adapted primarily to squeeze out monomer, the section 26 acts as a compression section for condensation resins to squeeze out resin, reduce final shrinkage, and control directional movement of reaction gases. The taper of the transition section 26 can be matched to the shrinkage characteristics of the condensation resins. The resin injection section 24 and the transition section 26 are most likely to be adjusted for this optimization. If desired, for some processes, these two sections can be combined as a single modular section.

Most of the polymerization and cure of the addition-type monomers occurs in the profile section 28 which has a hollow bore 30D and an exit orifice 36. The polymerization reaction is itself exothermic which helps accelerate polymerization due to several types of free-radical initiators that decompose at the higher temperature levels produced during the polymerization process. If desired, the profile section 28 may also be heated to accelerate polymerization and cure of the final product. Typically, this section is heated to a temperature which is above the temperature of the injection section 24.

The cross-sectional area and length of the bore 30D may be selected so that the peak temperature of the reaction exotherm occurs at an intermediate position along the length of the bore to assure a suitable degree of curing when the product exits through exit orifice 36. The bore 30D may be uniform in cross section or tapered in the direction of product travel, depending on the degree of shrinkage of the resin as it cures. In addition, the exit orifice may be shaped to form product of any desired shape, such as square, rectangular, round, etc.

Figure 4:
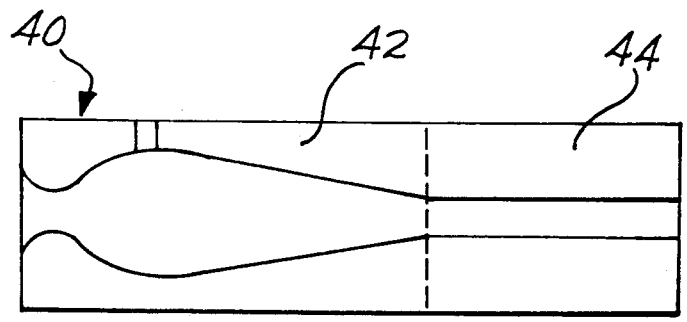
FIG. 4 is a cross-sectional view of another modular injection die in accordance with the present invention.

FIG. 4 shows another modular die 40 in accordance with the present invention. The die 40 comprises an inlet/resin injection transition section 42 and a separate profile section 44. The operation of the die 40 is similar to the operation of die 20. The inlet/resin injection transition section 42 basically comprises an "adaptation" die which may be connected to a conventional non-injection die (in essence, profile section 44) by suitable means, such as clamps, bolts, etc., to convert the conventional die to a resin injection die.

In another embodiment of the present invention, the sections are further segmented, such as by dividing a section about the longitudinal axis of its bore 20. This segmentation allows individual sections to be replaced to change the die configuration without restringing the reinforcing strands through the entire pultrusion apparatus.

Resin Tests

Tests 1 and 2 were run using a "polyester design" injection die for 0.975 cm rods on a standard pultrusion machine. Fiberglass roving was used to obtain about 70% glass by mass.

Base case resin:
  Phenolic resole
  Solids:80 to 85% (by mass)
  Viscosity at 25° C.:10,000–20,000 cp
  pH at 25° C.:6.0 to 7.0

Test 1. The Base Case resin was run at two resin preheat temperatures (40°, 65° C.) and die temperatures of 180° and 200° C. with strand speed of from 4 to 24 cm/min. The product was analyzed for degree of cure and shrinkage. The degree of cure was considered acceptable at 80%, which occurred at 18 cm/min at 180° C. and 24 cm/min at 200° C. Shrinkage varied between 2.9 to 5.1% in area.

Test 2. The Base Case resin was mechanically injected into the die at room temperature without preheating. Injection pressure ranged from 30 to 100 psi, with other variables the same as in Test 1. Material was pultruded satisfactorily with complete penetration of the resin into the fiberglass strands at all pressures.

Test 3. Three series of tests were made using phenolic resin and one series of tests was made using a polyester resin. The results of the tests are summarized in TABLE 1.

All of the runs of this test were made using an experimental segmented condensation resin die having three sections: entry, injection/transition, and profile. The upper half of the die was segmented: lower half was a single part to facilitate experimentation. The product profile was rectangular in cross-section with dimensions of 9 by 32 mm. The total length of the die was 1 m. The phenolic resin was the base case resin used above. Polyester resin was commercially-available (Advanced Coatings, Boston, MA) and unfilled. The fiberglass used was the same as in previous runs and consisted of 72 strands, which was the equivalent of 50% volumetric loading of fiberglass. The die was heated using eight contact strip heaters, two pairs at each of the top and bottom of the die, downstream from the resin injection port. Speed was monitored by a tachometer attached to one strand of fiberglass before the inlet. Pressure was maintained by a constant pressure pump.

TABLE 1

Runs and conditions for Test 3.

| Run | Resin | Additive | Temp (°C.) | Speed (cm/min) | Pressure (psi) | Product Quality |
|---|---|---|---|---|---|---|
| 3A-1 | Phenolic | None | 180 | 30 | 30 | Good |
| 3A-2 | Phenolic | None | 180 | 40 | 30 | Poor |
| 3A-3 | Phenolic | None | 180 | 40 | 40 | Good |
| 3A-4 | Phenolic | None | 180 | 50 | 50 | Poor |
| 3A-5 | Phenolic | None | 200 | 50 | 50 | Poor/Good |
| 3A-6 | Phenolic | None | 200 | 50 | 60 | Good |
| 3B-1 | Phenolic | 1% Silane | 180 | 40 | 40 | Good |
| 3B-2 | Phenolic | 1% Silane | 180 | 40 | 30 | Good |
| 3B-3 | Phenolic | 1% Silane | 180 | 40 | 25 | Good |
| 3B-4 | Phenolic | 1% Silane | 180 | 45 | 25 | Good |
| 3B-5 | Phenolic | 1% Silane | 180 | 50 | 25 | Poor |
| 3C-1 | Phenolic | 1% Caustic | 180 | 30 | 30 | Good |
| 3C-2 | Phenolic | 1% Caustic | 180 | 40 | 40 | Good |
| 3C-3 | Phenolic | 1% Caustic | 180 | 50 | 50 | Good |
| 3C-4 | Phenolic | 1% Caustic | 180 | 60 | 60 | Good |
| 3C-5 | Phenolic | 1% Caustic | 180 | 70 | 60 | Poor |
| 3C-6 | Phenolic | 1% Caustic | 200 | 60 | 60 | Good |
| 3C-7 | Phenolic | 1% Caustic | 200 | 70 | 60 | Good |
| 3C-8 | Phenolic | 1% Caustic | 200 | 80 | 60 | Poor |
| 3D-1 | Polyester | None | 150 | 20 | 20 | Poor/Good |
| 3D-2 | Polyester | None | 150 | 20 | 30 | Poor/Good |
| 3D-3 | Polyester | None | 150 | 40 | 30 | Poor |
| 3D-4 | Polyester | None | 150 | 40 | 60 | Poor |
| 3D-5 | Polyester | None | 150 | 30 | 60 | Poor/Good |

For run series 3A, the phenolic was run at speeds beginning at 30 cm/min and at a pressure of 30 psi. When speed was increased to 40 cm/min, the resulting product delaminated. When pressure was increased to 40 psi, the delamination ceased. At 50 cm/min, increases in pressure to 60 psi did not prevent delamination, indicating that penetration of the resin was not the limiting parameter. At 50 cm/min and 50 psi, and with the temperature raised from 180° C. to 200° C., the product improved although there was slight delamination. Further increase in pressure to 60 psi produced an acceptable product. This series of runs demonstrated the importance of resin pressure level and control on penetration of the resin and subsequent product quality, and the effect of temperature on accelerating the curing of the resin.

In series 3B, 1% silane by weight was added to the neat phenolic resin. In the first three runs of this series, speed and temperature were maintained at constant levels while resin pressure was sequentially reduced from 40 to 25 psi. All three runs produced acceptable product. At a constant pressure of 25 psi, speed was increased to 45 and then 50 cm/min, at which point unacceptable product resulted. This series indicated that silane promoted fiberglass penetration by the resin at substantially lower pressures than in series 3A.

For series 3C, 1% caustic soda by weight was added to the neat phenolic resin to shift the pH from approximately 6 (neutral) to about 10. Both speed and pressure were increased in uniform steps to 60 cm/min and 60 psi, all giving acceptable product. However, when the speed was increased to 70 cm/min, the product delaminated. The temperature was increased to 200° C. and speed reduced to 60 cm/min at a pressure of 60 psi, which yielded acceptable product. At these temperature and pressure conditions, speed was increased to 80 cm/min before delamination. This series demonstrated that an increase in pH can be used to accelerate resin curing to obtain acceptable product, provided resin pressure is adequate for fiberglass penetration.

The final series, 3D, was run using a standard commercial polyester resin, which was unfilled, to provide a comparison with the phenolic process. Die temperature was set to 150° C., which was previously established as the upper limit for satisfactory product of profiles having similar thicknesses. At 20 cm/min and 20 and 30 psi, the product was considered marginal because of hairline delamination. When speed was increased to 40 cm/min and pressure increased to 60 psi, substantial delamination occurred. By maintaining pressure at 60 psi and reducing speed to 30 cm/min, a marginally acceptable product was produced. This series demonstrated that polyester resin curing is limited to no greater than 30 cm/min in order to obtain acceptable product for the particular profile being pultruded.

Although preferred embodiments of the present invention have been shown, it is obvious than many modifications and variations of the present invention are possible in light of the above teachings. It is therefore to be understood that the present invention may be practiced otherwise than as specifically described.

What is claimed is:

1. A method for making a resin bonded composite pultruded product, the method comprising:
   providing a pultrusion system which further comprises reinforcing material supply means, a pultrusion die, injection means for injecting resin into the die, and pulling means for drawing product through the die;
   supplying strands of a reinforcing material to the die and grasping the strands with the pulling means;
   injecting a liquid phenolic resin into the die so as to impregnate the reinforcing material within the die, the resin having a solids content of at least 70%;
   heating the resin to a temperature, below the point of polymerization, at which the viscosity of the resin is reduced to assist in impregnation of the reinforcing material; and
   drawing the resin-impregnated strands through the die with the pulling means to produce a composite product, the resin-impregnated strands being pulled at a rate that permits the resin to condense, in the absence of an acid catalyst, to an essentially cured state before the composite product exits the die.

2. A method for making a reinforced composite pultruded product, comprising:
   providing a pultrusion system which comprises reinforcing material supply means, a pultrusion die, injection means for injecting resin into the die, and pulling means for drawing product through the die;
   supplying an elongated reinforcing material to the die;
   injecting a liquid phenolic resin into the die so as to impregnate the reinforcing material within the die and to form a combination of the reinforcing material and the resin, the resin having a solids content of at least about 80%;
   heating the resin to a temperature sufficient to reduce the viscosity of the resin so as to assist in impregnation of the reinforcing material; and
   drawing the combination through the die with the pulling means to produce a reinforced composite product, the combination being pulled at a rate that permits the resin to condense to a hardened state before the combination exits the die.

3. The method of claim 2 wherein the resin comprises a neutral phenolic resin.

4. The method of claim 2 wherein the resin comprises a basic phenolic resin.

5. The method of claim 2 wherein the resin is heated to a temperature of about 60° C. prior to injection.

6. The method of claim 2 wherein the die is heated to a temperature of at least about 180° C.

7. The method of claim 2 wherein the resin is injected into the die under pressure.

8. The method of claim 2 wherein the heating is sufficient to reduce the viscosity of the resin to less than about 200 centipoises prior to the injecting.

9. A method for making a reinforced composite pultruded product, the method comprising:
   providing a pultrusion system which includes reinforcing material supply means, a pultrusion die, injection means for injecting resin into the die, and pulling means for drawing product through the die;
   supplying reinforcing material to the die;
   heating a liquid phenolic resin, having a solids content of at least 70%, to a temperature sufficient to reduce the viscosity of the resin;
   injecting the heated resin into the die so as to impregnate the reinforcing material and to form, under pressure within the die, a combination of the reinforcing material and the resin; and
   drawing the combination through the die with the pulling means to produce a reinforced composite product, the combination being pulled at a rate that permits the resin to harden before the combination exits the die.

10. A method for making a reinforced composite pultruded product, the method comprising:
    providing a pultrusion system which includes reinforcing material suppy means, a pultrusion die and pulling means for drawing product through the die;
    combining reinforcing material and a liquid phenolic resin, having a solids content of at least 70%, to form a combination of the reinforcing material and the resin; and
    drawing the combination through the orifice of a pultrusion die with the pulling means to produce a reinforced composite product.

* * * * *